(12) United States Patent
Al-Saeed

(10) Patent No.: US 8,794,690 B1
(45) Date of Patent: Aug. 5, 2014

(54) PICKUP TRUCK BED COVER

(71) Applicant: Masoud M. A. Al-Saeed, Safat (KW)

(72) Inventor: Masoud M. A. Al-Saeed, Safat (KW)

(*) Notice: Subject to any disclaimer, the term of this patent is extended or adjusted under 35 U.S.C. 154(b) by 0 days.

(21) Appl. No.: 14/226,521

(22) Filed: Mar. 26, 2014

(51) Int. Cl.
B60P 7/02 (2006.01)
B60J 7/16 (2006.01)

(52) U.S. Cl.
CPC .................................. B60J 7/1621 (2013.01)
USPC .................................. 296/100.1; 296/100.06

(58) Field of Classification Search
USPC .............. 296/100.06, 100.07, 100.08, 100.1, 296/100.02
See application file for complete search history.

(56) References Cited

U.S. PATENT DOCUMENTS

| | | | |
|---|---|---|---|
| 3,069,199 A | 12/1962 | Reardon et al. | |
| 3,858,744 A | 1/1975 | Garvert | |
| 6,106,050 A | 8/2000 | McLeod | |
| 6,254,169 B1 | 7/2001 | Arthur | |
| 6,598,930 B1 | 7/2003 | Tilton | |
| 6,616,210 B1 | 9/2003 | Massey | |
| 7,384,089 B1 | 6/2008 | Ablang et al. | |
| 2004/0026948 A1 | 2/2004 | Novajovsky | |
| 2006/0066130 A1* | 3/2006 | King et al. | 296/100.1 |
| 2008/0174142 A1* | 7/2008 | Pearlman | 296/100.1 |
| 2009/0230718 A1 | 9/2009 | Getschel et al. | |

* cited by examiner

Primary Examiner — Joseph D Pape
(74) Attorney, Agent, or Firm — Richard C. Litman

(57) ABSTRACT

The pickup truck bed cover has two laterally disposed rigid panels, the panels being hingedly attached to the upper edges of the cargo box sidewalls. Each panel is operated by a separate actuator, with the actuators mounted near the sidewall upper edges to avoid intrusion upon the cargo floor area. The actuators are mounted at about the longitudinal midpoints of the sidewalls, to avoid asymmetric forces on the cover panels during operation. The actuators comprise jackscrews driven by motors that are controlled by a switch panel in the vehicle cab. The motors may be electric, or may comprise electrohydraulic power packs having electric motors driving hydraulic pumps that in turn drive hydraulic motors to actuate the jackscrews. The gear reduction and threaded jackscrew of each actuator provide positive retention of oversize cargo within the vehicle box, positively locking down any such cargo to prevent its shifting or unauthorized removal.

18 Claims, 7 Drawing Sheets

PICKUP TRUCK BED COVER

BACKGROUND OF THE INVENTION

1. Field of the Invention

The present invention relates generally to doors and movable panels for enclosures, and particularly to a motorized pickup truck bed cover for securing a pickup truck box or bed and any contents thereof.

2. Description of the Related Art

The light pickup truck has become an increasingly popular motor vehicle in the U.S. and in many other parts of the world as well. The versatility of such vehicles for carrying a limited number of passengers, as well as a relatively large volume of cargo, greatly accounts for their popularity with motor vehicle owners and operators. While they are quite popular with small business owners, construction contractors, and others in similar fields, they are also very popular with individuals using them only as routine transportation and for the occasional carriage of miscellaneous articles.

Perhaps the greatest drawback of such pickup truck vehicles is their conventionally open cargo areas in the truck beds, and the resulting ease of access by unauthorized persons. This has led to a great number of tool storage boxes, covers, and enclosures for the otherwise open bed, with these various storage boxes, covers, and enclosures being permanently secured to the bed structure or at least being relatively difficult to open or remove by unauthorized parties. Insofar as the bed cover configurations are concerned, nearly all such covers are manually operated and are thus relatively cumbersome to open and close. This is true of both rigid covers and flexible tarp type covers.

Another problem with such bed covers and enclosures is that they incorporate various support struts and the like, with the bases of these struts usually attached to the floor of the vehicle cargo bed or box. Horizontal space in the cargo boxes of pickup trucks is generally somewhat limited, particularly laterally due to the encroachment of the wheel wells for the rear wheels and tires of the vehicle. The mounting of support struts and the like to the floor of the cargo box further encroaches upon the otherwise available flat cargo space. In some cases, such support struts have been installed at the head of the cargo box. While this improves the available lateral flat space across the floor of the box, the resulting support of the overlying bed or box cover panels at only one end or edge thereof creates undue asymmetrical stresses on the cover panels and requires significantly increased structure and weight for the mechanism.

Thus, a pickup truck bed cover solving the aforementioned problems is desired.

SUMMARY OF THE INVENTION

The pickup truck bed cover comprises two laterally disposed rigid panels, with each panel being hingedly affixed to the upper edge of a corresponding one of the side walls of the cargo box. Each panel is operated by a separate motor and jackscrew actuator with each of the actuators being mounted relatively high on a side wall of the cargo box, adjacent to the upper edge of the side wall. The actuators are attached to the upper portions of the side walls at generally medial positions therealong, between the forward and rearward ends of the side walls. The distal ends of the actuator struts attach to each door or panel at a generally medially disposed reinforced area thereof in order to avoid asymmetrical forces during operation.

The system is preferably electrically operated from a switch panel located in the cab of the vehicle. The switch panel provides electrical power to an actuating motor, which motor drives a jackscrew to extend or retract the panel. Alternatively, the electrical system may provide power to an electrically driven hydraulic pump that in turn drives a hydraulic motor to operate the jackscrew. The mechanical advantage provided by the gear reduction system, along with the threaded jackscrew extension and retraction strut, provides positive retention and lockdown of any outsize cargo that may be carried within the vehicle cargo bed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
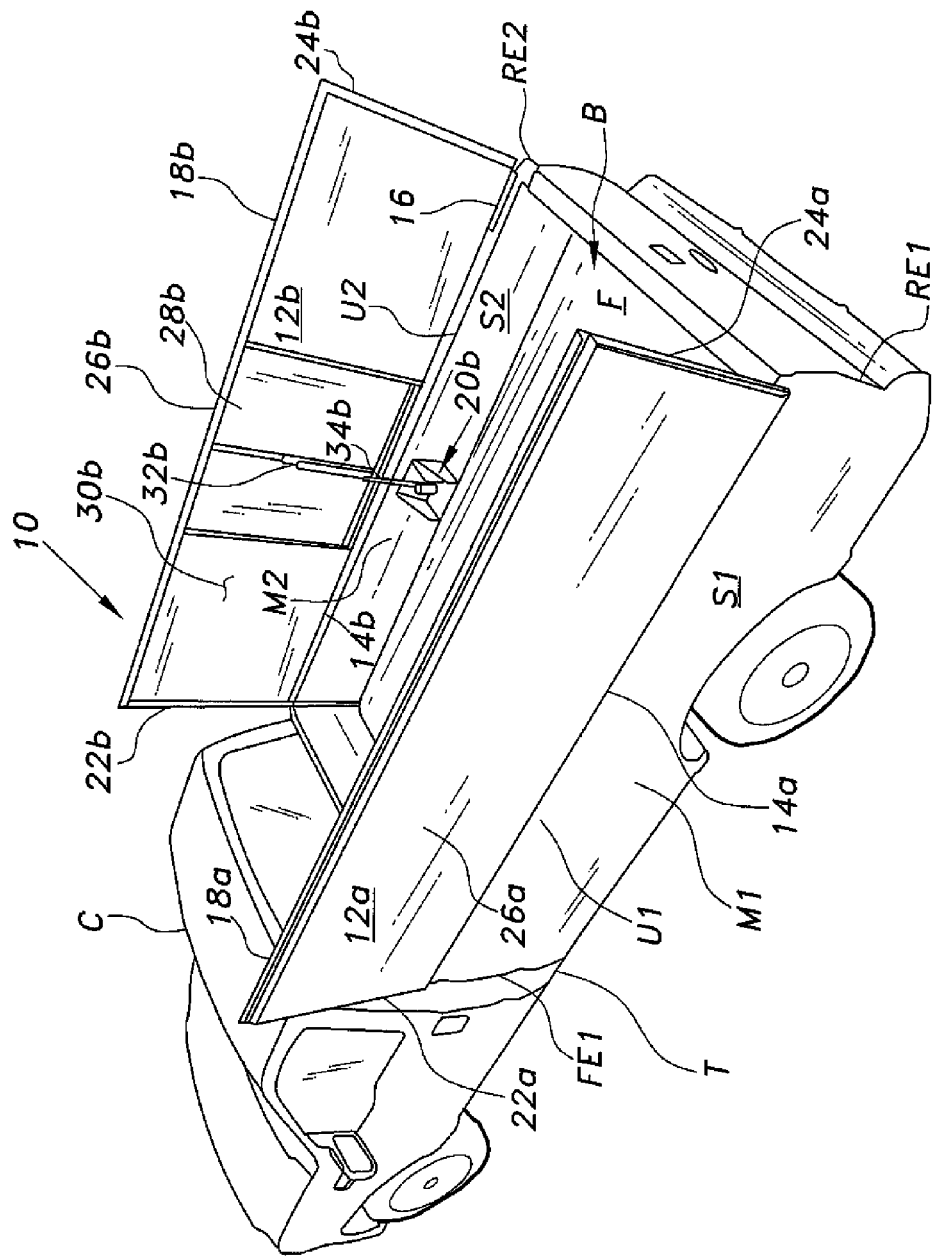
FIG. 1 is an environmental, perspective view of a pickup truck having the pickup truck bed cover, according to the present invention installed thereon.

The pickup truck bed cover 10 comprises two laterally disposed, motorized rigid panels 12a and 12b that open and close to positively secure the cargo bed of the truck and any articles stored therein. FIG. 1 of the drawings provides a perspective view of a pickup truck T having a forwardly disposed cab C and a rearwardly disposed bed B. The bed B has laterally opposed first and second sidewalls, respectively S1 and S2, with the two sidewalls defining the bed floor F therebetween. Each of the sidewalls S1 and S2 further has a forward end, respectively FE1 and FE2, an opposite rearward end, respectively RE1 and RE2, and a medial portion, respectively M1 and M2.

The pickup truck bed cover 10 includes a first panel 12a and a laterally opposed second panel 12b. Each panel 12a, 12b has an outer edge, respectively 14a and 14b, secured respectively to the first and second upper edges U1, U2 of the two side panels S1, S2 by hinges 16. Each panel 12a, 12b is configured to cover substantially half of the area of the truck bed B, with the inner edges 18a, 18b of the panels 12a, 12b mating with one another to provide a substantially weatherproof seal when the panels are closed, as described in detail further below.

First and second actuators, respectively 20a and 20b (the second actuator is illustrated in other FIGS.), drive the respective panels 12a, 12b. The two actuators 12a, 12b are affixed to the respective sidewalls S1, S2 of the bed B at positions adjacent to the upper edges U1 and U2 of the two sidewalls, well above the floor F of the bed B, as shown clearly in FIGS. 1, 2, 4, and 7 of the drawings. The relatively high location of each actuator 20a, 20b avoids encroachment on the area of the floor F of the truck bed B, thereby providing additional floor area for the carriage of various articles in the bed B. Moreover, since the beds of most pickup trucks have wheel wells (e.g., wells W1 and W2, FIG. 2) encroaching in the bed space, the actuators 20a, 20b may be positioned above the wheel wells, thereby obviating any requirement for additional bed space as shown in FIG. 2 of the drawings.

Figure 2:
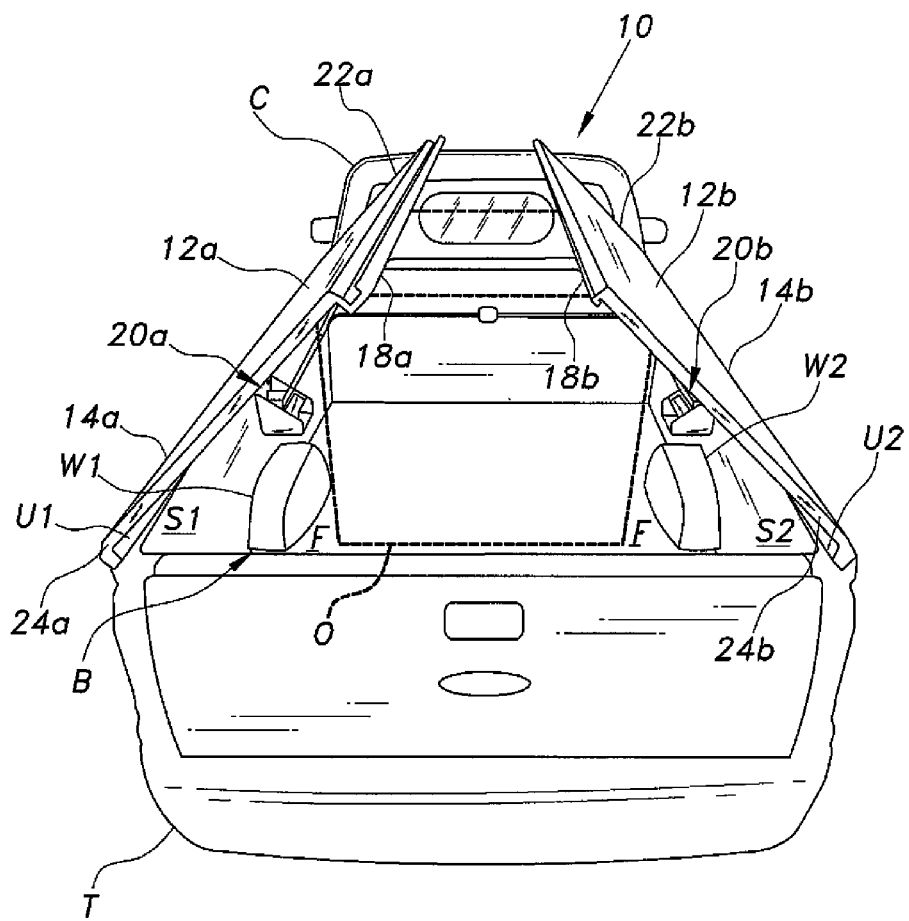
FIG. 2 is a rear perspective view of a pickup truck, showing the installed pickup truck bed cover, according to the present invention in a partially opened state to secure an article of cargo in the bed.
Figure 4:
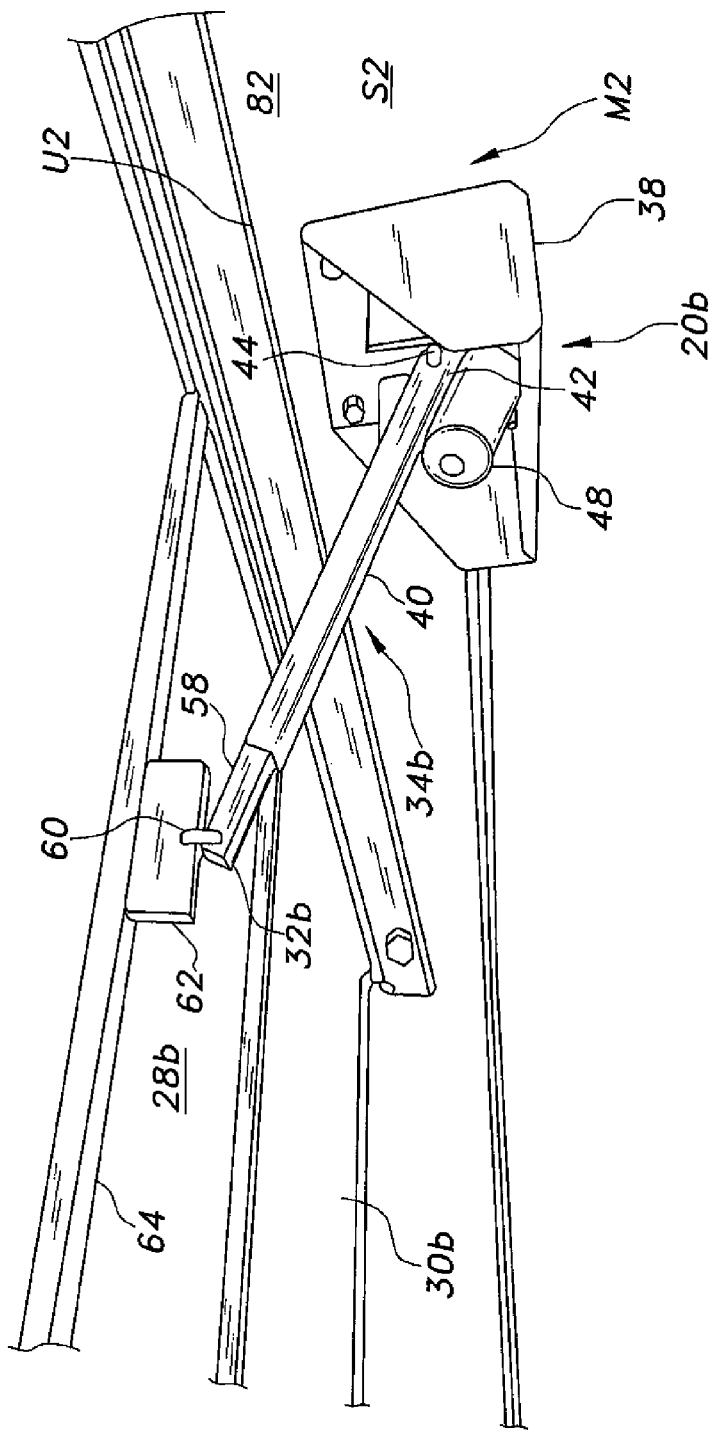
FIG. 4 is a detailed perspective view of the actuator for one of the panels of the pickup truck bed cover, according to the present invention.

It will be further noted particularly in FIGS. 1 and 2 that each actuator 20a, 20b is installed upon the medial portion M1, M2 of its respective sidewall S1, S2, substantially equidistant between the respective ends FE1, FE2 and RE1, RE2 of the two sidewalls. Each panel 12a, 12b has a forward end, respectively 22a and 22b, and an opposite rearward end, respectively 24a and 24b, with the ends of each panel defining a medial portion, respectively 26a and 26b, therebetween. A reinforcement plate is installed upon the inner surface of each panel 12a, 12b, in or on the medial portion thereof. (The reinforcement plate 28b and panel inner surface 30b are illustrated in FIGS. 1 and 4, with it being understood that the two panels 12a, 12b are mirror images to one another and have identical components and features.) As the panels 12a, 12b have their masses distributed substantially uniformly therealong and thereacross, it will be seen that the panel mass forward, rearward, inboard and outboard of the reinforcement plate is substantially equal. Thus, as the distal end 32a, 32b of each actuator strut 34a, 34b is connected substantially to the center of each reinforcement plate, e.g., the second plate 28b as shown clearly in FIGS. 1 and 4 of the drawings, it will be seen that the forces imposed upon each panel 12a, 12b are substantially longitudinally and laterally symmetrical as the panels are opened and closed. This configuration substantially obviates any asymmetrical forces on the two panels 12a, 12b during actuation, thereby precluding need for additional reinforcement (and corresponding weight) being added to the panels.

Figure 3:
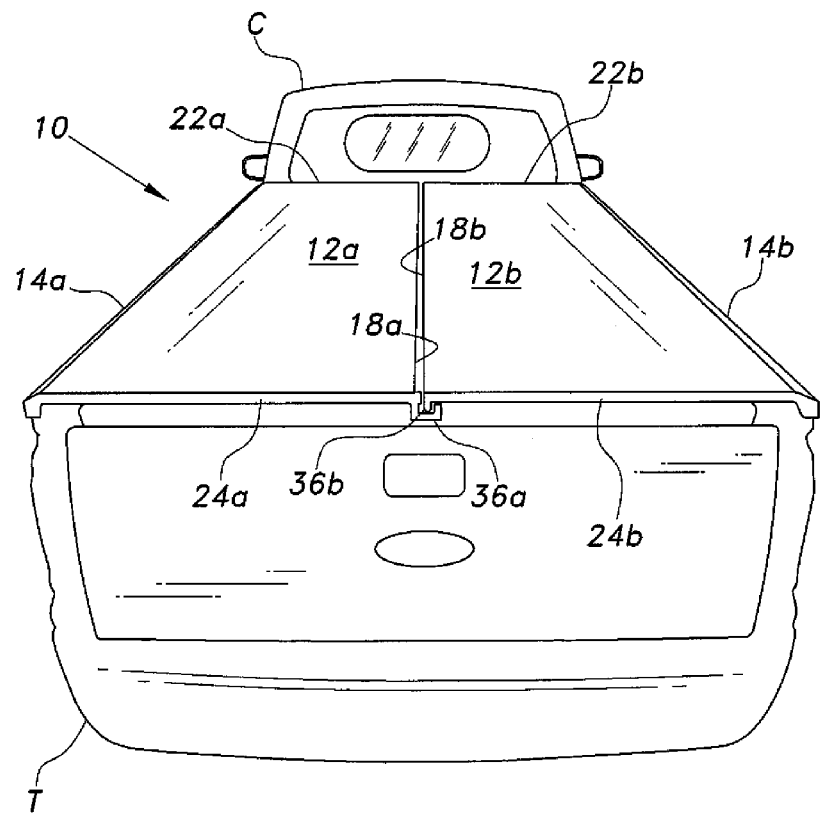
FIG. 3 is a rear perspective view of a pickup truck, showing the installed pickup truck bed cover, according to the present invention in a closed state.

FIG. 3 of the drawings provides an illustration of the two panels 12a, 12b in their closed positions. It will be seen that there is by necessity a slight gap between the inboard edges 18a, 18b of the two panels, even in their closed positions. This gap is made substantially weatherproof by providing one of the panels, e.g., the first panel 12a, with a generally U-shaped channel 36a depending from its inboard edge 18a, with the second panel 12b having a lip 36b depending from its inboard edge 18b. The lip 36b of the second panel 12b seats within the channel 36a of the first panel 12a, precluding the entry of rainwater, snow, sand and dust, etc. between the inboard edges 18a, 18b of the two panels 12a, 12b. Any rainwater, etc. that runs into the channel 36a will run off from the forward and/or rearward ends of the channel beyond the truck bed B.

Figure 5:
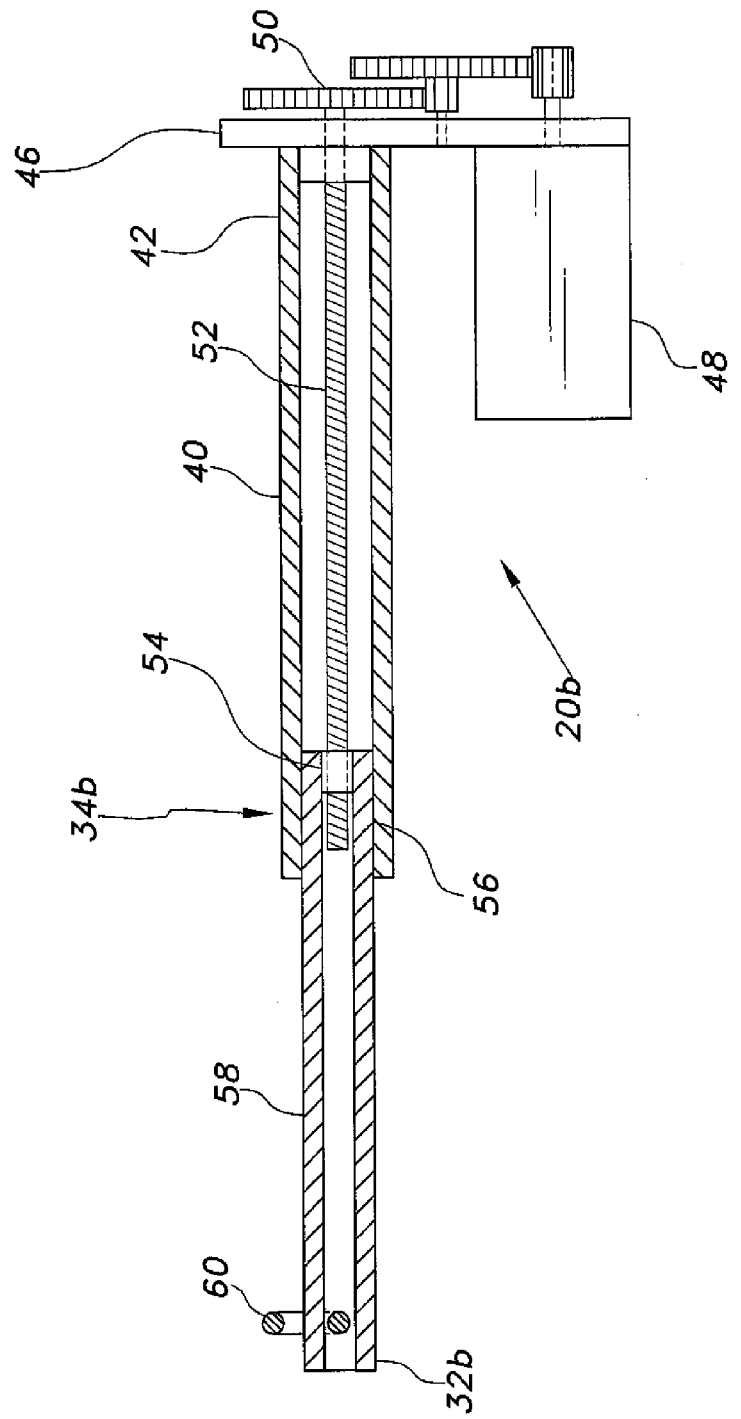
FIG. 5 is an elevation view in partial section of one of the actuators for the pickup truck bed cover, according to the present invention.

FIGS. 4 and 5 of the drawings provide detailed illustrations of the actuator mechanisms used to operate the two panels 12a and 12b. While only the second actuator 20b is illustrated in these two FIGS., it will be understood that the two actuators comprise substantially equal components and are installed in mirror image to one another. Each actuator, e.g., the actuator 20b, is mounted in a bracket 38 that is in turn affixed to the upper portion of the sidewall of the truck bed adjacent the upper edge of the sidewall, generally as shown in FIG. 4. The actuator strut 34b includes a base tube 40 with a bracket attachment end 42 secured to the bracket 38 by a pin 44 that passes through the end 42 of the base tube 40. (The bracket attachment end 42 of the base tube 40 may be affixed to a plate 46 that is in turn pivotally attached to the bracket 38, with the plate supporting the base tube 40, drive motor, and gearing, as shown in FIG. 5.) Thus, the base tube 40, and the remainder of the strut 34b, is able to pivot relative to the fixed bracket 38 and the sidewall as the panel is opened and closed.

FIG. 5 of the drawings provides a detailed schematic representation of the actuator mechanism. A drive motor 48 is affixed to, or adjacent to, the bracket attachment end 42 of the base tube 40 and pivots therewith as the mechanism moves during operation. The drive motor 48 may be a conventional electric motor, or may comprise a conventional electrohydraulic power pack having an electric motor driving a hydraulic pump, which in turn drives a hydraulic motor. In the exemplary system shown in FIG. 5, the drive motor 48 and bracket attachment end 42 of the base tube 40 are immovably affixed to the plate 46, with the plate being pivotally mounted within the actuator bracket 38 (not shown in FIG. 5). A speed reduction gear train 50 is installed upon the plate 46 between the drive motor 48 and a threaded jackscrew 52 that passes axially through the base tube 40. The gear train 50 serves to reduce the operational speed of the threaded jackscrew 52 to a reasonable rate, and also provides torque multiplication to the jackscrew 52 to allow a relatively small drive motor 48 to be used.

The jackscrew 52 passes through a mating internally threaded receptacle 54 affixed in the proximal end 56 of the panel attachment tube 58 that selectively telescopes from the base tube 40 according to rotation of the jackscrew 52. The base tube 40 has a square or other non-circular internal cross section, with the panel attachment tube 58 having a mating external cross section. Thus, the panel attachment tube 58 is prevented from rotating relative to the base tube and its attachment to the plate 46 or bracket 38. As the panel attachment tube 58 cannot rotate, the rotation of the jackscrew 52 results in driving the mating threaded receptacle 54, and thus the panel attachment tube 58, to extend from and retract into the base tube 40, depending upon rotation of the drive motor 48 and gear train 50.

The panel attachment tube 58 has a panel attachment end 32b (for the second actuator 20b shown in FIGS. 4 and 5) comprising the distal end of the strut assembly 34b, with a shackle or other connector 60 attached to the distal panel attachment end 32b. The shackle 60 in turn attaches to a panel attachment member 62 that is immovably affixed to the inner surface 30b of the panel, or more specifically to the reinforcement plate 28b (or reinforcement rib 64 or other strengthening member, as shown in FIG. 4).

FIGS. 1 through 3 generally illustrate the operation of the two panels 12a, 12b from their fully open position (FIG. 1) through an intermediate position (FIG. 2) and finally to their completely closed position (FIG. 3). It will be noted that the pickup truck bed B is shown carrying a relatively large and bulky object O therein, in FIG. 2. The mechanical advantage provided by the gear reduction system between the drive motor 48 (FIGS. 4, 5, and 7), the speed reduction gear train 50 (FIG. 5), and threaded jackscrew 52 driving the panel attachment tube 58 (FIG. 5), results in a positive mechanical linkage that precludes any significant or substantial movement of the associated panel when the drive motor 48 is not in operation. Thus, the panels 12a and 12b may be closed upon a large and bulky object such as the object O in the truck bed B in FIG. 2, and serve to lock the object O firmly within the truck bed B to preclude its movement during transport.

Figure 6:
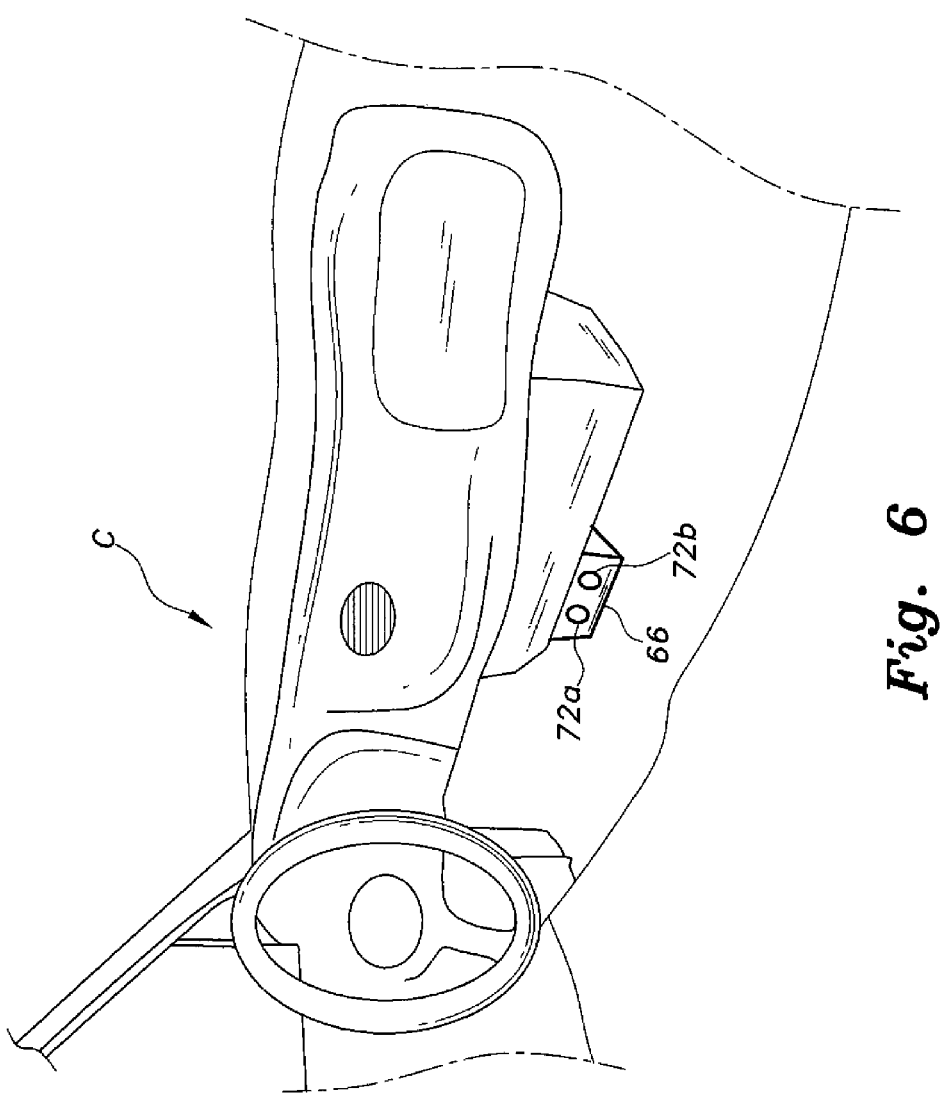
FIG. 6 is a perspective view of the interior of a pickup truck having the pickup truck bed cover, according to the present invention installed therewith, showing the control switch for the cover.
Figure 7:
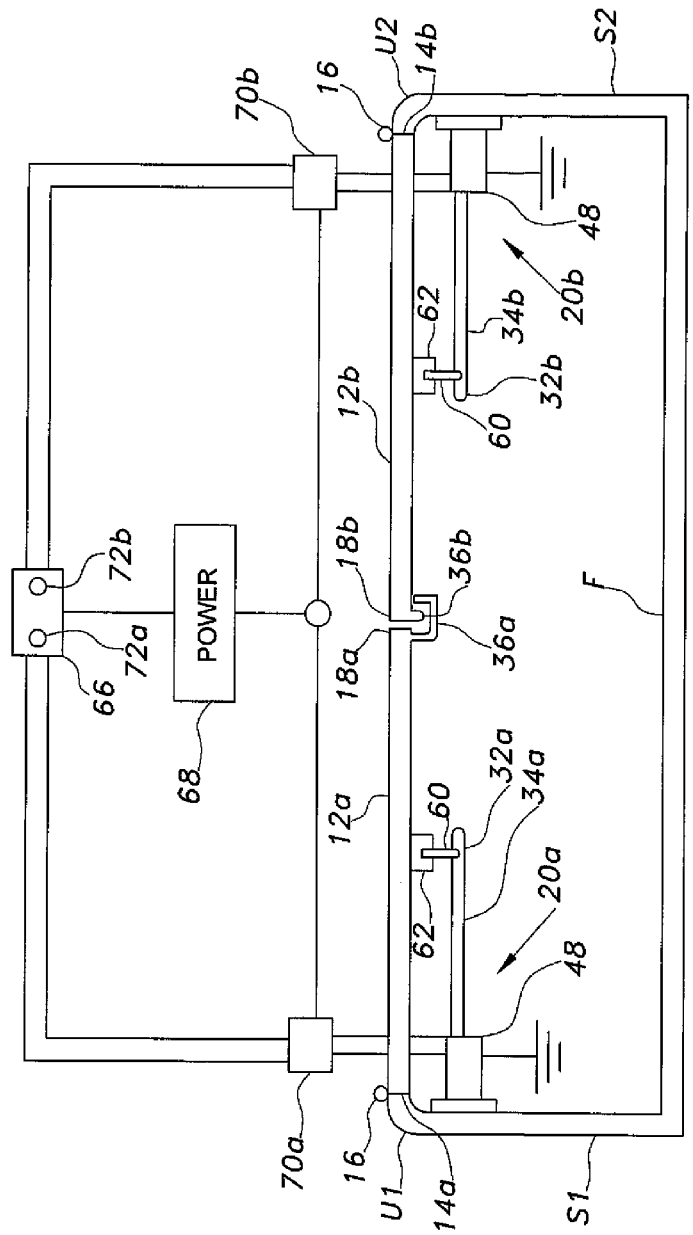
FIG. 7 is a schematic representation showing an exemplary electrical circuit for operating the pickup truck bed cover, according to the present invention.

Operation of the two panels 12a, 12b is controlled by an electrical switch console 66 preferably located in the cab C of the pickup truck, as shown in FIG. 6. FIG. 7 provides a schematic illustration of an exemplary electrical system for the operation of the panels 12a, 12b. Electrical power 68 is provided from the conventional electrical storage battery and/or alternator universally provided with pickup trucks and other motor vehicles. Electrical power is provided from the power source 68 to both the switch console 66 and to first and second double pole relays 70a and 70b, respectively providing electrical power to the two motors 48. The switch console 66 may have two separate switches 72a and 72b, respectively controlling the opening and closing of the two panels 12a and 12b. Operating one of the switches, e.g., the first switch 72a, closes one circuit to send electrical power to the two relays 70a, 70b, which relays close the selected circuit to actuate the two drive motors 48 in the selected direction of rotation, e.g., causing the motors to open the two panels 12a, 12b. Operating the second switch 72b closes the second circuit to close the other relay circuits, with the relays 70a, 70b providing electrical power to the two motors 48 to reverse their direction of rotation and close the two panels 12a, 12b. Conventional limit switches, torque-sensing switches, etc., may be used to limit the opening and closing of the two panels 12a, 12b, and sequencing switches may be included in the circuit to properly sequence the panel operation. The above-described electrical system is exemplary, and it will be seen that many other electrical system configurations may be provided to operate the two panels 12a, 12b. As noted further above, the two motors 48 are operated electrically, but each of the motors may comprise an electrohydraulic power pack having electrically driven hydraulic pump that in turn drives a hydraulic motor to open and close the two panels 12a, 12b as described further above.

It is to be understood that the present invention is not limited to the embodiments described above, but encompasses any and all embodiments within the scope of the following claims.

I claim:

1. In a pickup truck having a cab and a cargo bed, the cargo bed having laterally opposed first and second sidewalls defining a floor therebetween, each of the sidewalls having an upper edge, a forward end, a rearward end opposite the forward end, and a medial portion, a pickup truck bed cover, comprising:
a first panel and a second panel, each panel comprising a rigid structure having an outer edge hingedly attached to the upper edge of the respective sidewall and an inner edge opposite the outer edge; and
a first actuator and a second actuator, each actuator being affixed to the respective sidewall adjacent the upper edge thereof and well above the floor of the cargo bed, each actuator selectively driving the respective panel;
wherein each actuator includes:
a drive motor pivotally secured to the respective sidewall;
a telescoping strut extending from the drive motor, the strut comprising:
a base tube immovably affixed relative to the drive motor;
a threaded jackscrew disposed within the base tube, the jackscrew being selectively rotated by the drive motor; and
a panel attachment tube telescopically disposed within the base tube, the panel attachment tube having a panel connection end attached to the respective panel, the jackscrew being threadably engaged with and selectively extending and retracting the panel attachment tube relative to the base tube according to operation of the drive motor.

2. The pickup truck bed cover according to claim 1, further comprising:
each panel further having a forward end, a rearward end opposite the forward end, and a medial portion;
wherein, the panel connection end being attached to the medial portion of the respective panel.

3. The pickup truck bed cover according to claim 1 wherein each drive motor drives a speed reduction gear train, the gear train driving the threaded jackscrew, the drive motor, gear train, jackscrew, panel attachment tube, and attached panel comprising a positive mechanical linkage precluding substantial movement of the panel when the drive motor is not in operation.

4. The pickup truck bed cover according to claim 1, further comprising:
each panel having a medial portion with an inner surface;
a reinforcement plate disposed upon the medial portion of the inner surface of each panel; and
each actuator having a strut with a distal end, the distal end being attached to the reinforcement plate of the respective panel.

5. The pickup truck bed cover according to claim 1, wherein each drive motor is selected from the group consisting of electric motors and electrohydraulic power packs.

6. The pickup truck bed cover according to claim 1 further comprising a control switch panel disposed in the cab of the pickup truck, the control switch panel communicating electrically with each drive motor.

7. In a pickup truck having a cab and a cargo bed, the cargo bed having laterally opposed first and second sidewalls defining a floor therebetween, each of the sidewalls having an upper edge, a forward end, a rearward end opposite the forward end, and a medial portion, a pickup truck bed cover, comprising:
a first panel and a second panel, each panel comprising a rigid structure having an outer edge hingedly attached to the upper edge of the respective sidewall, an inner edge opposite the outer edge, a forward end, a rearward end opposite the forward end, and a medial portion;
a first actuator and a second actuator, each first and second actuator including:
a drive motor; and
a telescoping strut extending from the drive motor, the strut being selectively driven by the drive motor, the strut having a panel connection end attached to the medial portion of the respective panel;
wherein each first and second actuator includes:
the drive motor being pivotally secured to the respective sidewall;
a telescoping strut, extending from the drive motor, having a base tube immovably affixed relative to the drive motor;
a threaded jackscrew disposed within the base tube, the jackscrew being selectively rotated by the drive motor; and
a panel attachment tube telescopically disposed within the base tube, the panel attachment tube having a panel connection end attached to the respective panel, the jackscrew being threadably engaged with and selectively extending and retracting the panel attachment tube relative to the base tube according to operation of the drive motor.

8. The pickup truck bed cover according to claim 7 wherein each actuator is affixed to the respective sidewall adjacent the upper edge thereof and well above the floor of the cargo bed.

9. The pickup truck bed cover according to claim 7 wherein each drive motor drives a speed reduction gear train, the gear train driving the threaded jackscrew, the drive motor, gear train, jackscrew, panel attachment tube, and attached panel comprising a positive mechanical linkage precluding substantial movement of the panel when the drive motor is not in operation.

10. The pickup truck bed cover according to claim 7, further comprising:
  each panel having a medial portion with an inner surface;
  a reinforcement plate disposed upon the medial portion of the inner surface of each panel; and
  each actuator having a strut with a distal end, the distal end being attached to the reinforcement plate of the respective panel.

11. The pickup truck bed cover according to claim 7, wherein each drive motor is selected from the group consisting of electric motors and electrohydraulic power packs.

12. The pickup truck bed cover according to claim 7 further comprising a control switch panel disposed in the cab of the pickup truck, the control switch panel communicating electrically with each drive motor.

13. In a pickup truck having a cab and a cargo bed, the cargo bed having laterally opposed first and second sidewalls defining a floor therebetween, each of the sidewalls having an upper edge, a forward end, a rearward end opposite the forward end, and a medial portion, a pickup truck bed cover, comprising:
  a first panel and a second panel, each panel comprising a rigid structure having an outer edge hingedly attached to the upper edge of the respective sidewall, an inner edge opposite the outer edge, a forward end, a rearward end opposite the forward end, and a medial portion;
  a first actuator and a second actuator, each actuator comprising:
  a drive motor pivotally secured to the respective sidewall;
  a telescoping strut extending from the drive motor, the strut comprising:
    a base tube immovably affixed relative to the drive motor;
    a threaded jackscrew disposed within the base tube, the jackscrew being selectively rotated by the drive motor; and
    a panel attachment tube telescopically disposed within the base tube, the panel attachment tube having a panel connection end attached to the respective panel, the jackscrew being threadably engaged with and selectively extending and retracting the panel attachment tube relative to the base tube according to operation of the drive motor.

14. The pickup truck bed cover according to claim 13 wherein each actuator is affixed to the respective sidewall adjacent the upper edge thereof and well above the floor of the cargo bed.

15. The pickup truck bed cover according to claim 13, wherein the panel connection end of each panel attachment tube is attached to the medial portion of the respective panel.

16. The pickup truck bed cover according to claim 13 wherein each drive motor drives a speed reduction gear train, the gear train driving the threaded jackscrew, the drive motor, gear train, jackscrew, panel attachment tube, and attached panel comprising a positive mechanical linkage precluding substantial movement of the panel when the drive motor is not in operation.

17. The pickup truck bed cover according to claim 13, further comprising:
  each panel having a medial portion with an inner surface;
  a reinforcement plate disposed upon the medial portion of the inner surface of each panel; and
  each actuator having a strut with a distal end, the distal end being attached to the reinforcement plate of the respective panel.

18. The pickup truck bed cover according to claim 13, wherein:
  each drive motor is selected from the group consisting of electric motors and electrohydraulic power packs; and
  a control switch panel is disposed in the cab of the pickup truck, the control switch panel communicating electrically with each drive motor.

* * * * *